United States Patent [19]
Harrington et al.

[11] Patent Number: 6,137,918
[45] Date of Patent: Oct. 24, 2000

[54] MEMORY EFFICIENT METHOD AND APPARATUS TO ENABLE TAGGING OF THIN ANTIALIASED LINES

[75] Inventors: Steven J. Harrington; Robert P. Loce, both of Webster, N.Y.

[73] Assignee: Xerox Corporation, Stamford, Conn.

[21] Appl. No.: 09/046,426

[22] Filed: Mar. 23, 1998

[51] Int. Cl.⁷ .................................................. G06K 9/40
[52] U.S. Cl. ............................................. 382/269; 382/266
[58] Field of Search .................................... 382/266–269, 382/242; 345/136, 137–138

[56] References Cited

U.S. PATENT DOCUMENTS

| | | | |
|---|---|---|---|
| 5,138,339 | 8/1992 | Curry et al. | 346/108 |
| 5,386,509 | 1/1995 | Suzuki et al. | 395/162 |
| 5,432,898 | 7/1995 | Curb et al. | 395/143 |
| 5,438,656 | 8/1995 | Valdes et al. | 395/143 |
| 5,485,289 | 1/1996 | Curry | 358/448 |
| 5,596,684 | 1/1997 | Ogletree et al. | 395/109 |
| 5,646,751 | 7/1997 | Motamed et al. | 358/518 |
| 5,673,376 | 9/1997 | Ray et al. | 395/127 |
| 5,838,334 | 11/1998 | Dye | 345/503 |
| 6,057,855 | 5/2000 | Barkans | 345/136 |

OTHER PUBLICATIONS

"A Comparison of Antialiasing Techniques," IEE CG&A, vol. 1, No. 1, Jan. 1981, pp. 40–48, F. Crow.

*Primary Examiner*—Thomas D. Lee
*Assistant Examiner*—Stephen Brinich

[57] ABSTRACT

The present invention is a method for efficiently processing an image to detect antialiased pixels using reduced buffering memory. The method stores, in a scanline buffer memory, a predefined number of scanlines of data including data for a target pixel position and, in a tag buffer memory, a plurality of binary antialiasing tags, including at least a previously estimated tag for the target pixel position. Then using the stored pixel data and previously estimated tag, an antialiasing tag for the target pixel position is generated.

25 Claims, 9 Drawing Sheets

MEMORY EFFICIENT METHOD AND APPARATUS TO ENABLE TAGGING OF THIN ANTIALIASED LINES

This invention relates generally to a method and apparatus to enable the memory efficient detection of thin antialiased lines edges to enable accurate printing of antialiased images, and more particularly to a logic-based implementation for generating antialiased rendering tags by buffering both image data and antialiased tags assigned to prior pixel positions.

CROSS REFERENCE

The following related applications are hereby incorporated by reference for their teachings:

"METHOD FOR GENERATING RENDERING TAGS TO FACILITATE THE PRINTING OF ANTIALIASED IMAGES," P. Crean et al., application Ser. No. 09/046,232, filed concurrently herewith;

"A METHOD OF ENCODING HIGH RESOLUTION EDGE POSITION INFORMATION IN CONTINUOUS TONE IMAGE INFORMATION," N. Zeck et al., application Ser. No. 09/046,231, filed concurrently herewith;

"TEXT QUALITY ENHANCEMENT VIA RESOLUTION ENHANCEMENT TECHNIQUE BASED ON SEPARATING JAGGEDNESS DETECTION AND FILTERING," R. Eschbach, application Ser. No. 08/937,406, filed Sep. 25, 1997; and "TAGGING OF ANTIALIASED IMAGES," R. Loce et al., application Ser. No. 09/046,424, filed concurrently herewith; and "METHOD TO ENABLE THE RECOGNITION AND RENDERING OF ANTIALIASED IMAGES," R. Loce et al., application Ser. No. 09/046,414, filed concurrently herewith.

BACKGROUND AND SUMMARY OF THE INVENTION

Antialiasing in the context of digitizing line art and certain graphical image structures is best known as a method of using intermediate levels of intensity to achieve subpixel position of edges for several reasons including reduction or elimination of jaggies on the edges of lines and polygons, including text. Jaggies are, primarily visible at the edges of sloped lines approaching horizontal or vertical. The term antialiasing suggests an analog term aliasing; normally representing the presence of low frequencies resulting from sampling high frequency signals at too low a sampling rate.

Figure 1:
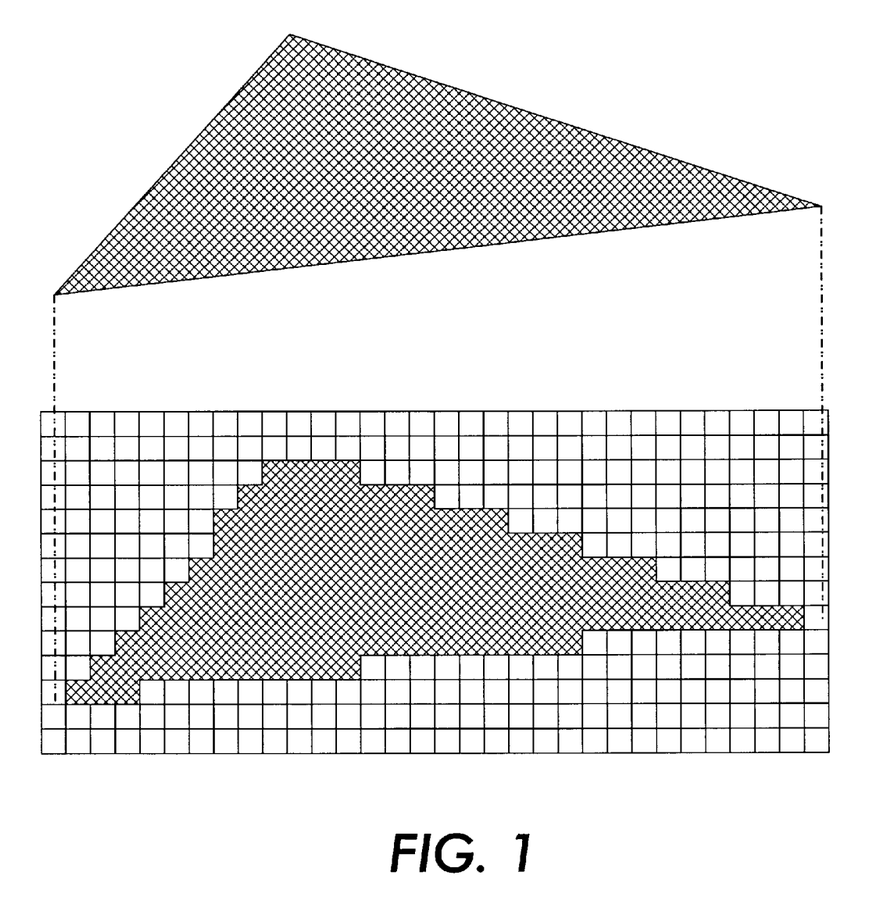
FIG. 1 is an illustration of a potential effect of aliasing in a digitized document image.

Consider a near-vertical (or near-horizontal) line segment. To be perfectly reproduced in a printed media, the phase, which represents the location of the edge, must continuously vary along the length of a segment. Due to the inherent sampling of a bi-level display or printed output, the phase exhibits jump discontinuities. Thus, this form of aliasing artifact, leads to an induced jagged appearance where the structures are referred to jaggies. Within a sampled image any graphical object is eventually approximated as a polygon or collection of polygons. These polygons have straight edges some of which will exhibit aliasing (jaggies and other placement defects). FIG. 1 for example shows aliasing in two dimensions. When the triangle on the top of FIG. 1 is rasterized, the edges are aliased as reproduced in the triangle shown at the bottom of FIG. 1. In particular, the position along the bottom edge should move up slightly from column to column as one looks from left to right in the image at the bottom of FIG. 1. However, the position is quantized, as illustrated, producing the jagged appearance along the bottom of the triangle. Visibility of the anti-aliased image artifacts is increased by the regular nature of the jaggies, again a result of sampling.

Consider the following systems and their capability, or incapability, to utilize antialiased pixels. Xerox's Docucolor 40, for example, employs a high frequency analog line screen to render antialiased pixels, but that is not an option for some products or marked segments. When conventional screens (e.g., approximately equal to 130–150 CPI dots) are employed in a rendering module, antialiased pixels are halftoned and printed, resulting in objectionable halftone dots positioned along character edges. Hyperacuity printing techniques, for example those described by Curry, et al. (U.S. Pat. Nos. 5,138,339 and 5,485,289) can provide rendering for antialiased pixels that is compatible with simultaneously printing dot screen halftones in enhanced line art. However, these techniques require the use of tags to identify the antialiased pixels as antialiased line art. In the preferred embodiments described with respect to the present invention the rendering architecture distinguishes binary text/line from contone images to appropriately treat both image types. As will be described herein an algorithm or method may be employed in a rendering module or in other components of the rendering device to produce gray antialiased pixels of a form suitable for Xerographic printing.

Antialiased images can be generated by capturing the image at a resolution greater than the final or desired output resolution, then reducing the resolution of the image by sub-sampling using an averaging process. A major benefit of antialiased images is that high contrast, saturated objects are surrounded with pixels possessing intermediate values that visually suggest the true, higher resolution position of object edges.

For example, in binary printing systems, such as many xerographic or ink jet systems that use a halftoning process to simulate continuous tone images, these antialiased edge pixels should be rendered with a very high frequency cell, ideally one having the resolution of the final output image. If the standard system halftone dot were to be used, the antialiased edges would be serrated or jagged at the standard halftone frequency. This rendering would reduce or even negate any value obtained through antialiasing. The use of a very high frequency screen over the entire antialiased image renders the antialiased pixel properly, but tends to sharpen the tonal curve and provoke print quality defects in the overall image.

Hence, the present invention is directed to a logic-based method for generating antialiased rendering tags within an architecture designed for the rendering of antialiased text or line regions, and to thereby enable the antialiased pixels to be rendered in a manner distinguishable from that applied to continuous tone portions of an image.

Heretofore, a number of patents and publications have disclosed information relevant to antialiasing, the relevant portions of which may be briefly summarized as follows:

U.S. Pat. No. 5,646,751 to Motamed et al., issued Jul. 8, 1997, teaches a method for improving the speed of a color conversion operation using pixel tagging.

In "A Comparison of Antialiasing Techniques," IEEE CG&A, Vol. 1, No. 1, January 1981, pp. 40–48, F. Crow teaches that prefiltering is a computationally effective technique for antialiasing.

In accordance with the present invention, there is provided a method for the detection of antialiased pixels within rasterized image data, comprising the steps of: storing, in a scanline buffer memory, a predefined number of scanlines of data including data for a target pixel position; storing, in a tag buffer memory, a plurality of binary antialiasing tags, including at least a previously estimated tag for the target pixel position; and generating, as a function of the pixel data for the target pixel and subsequent neighboring pixels and the previously estimated tag for the target pixel position, an antialiasing tag for the target pixel position.

One aspect of the invention deals with a basic problem in the rendering of antialiased images, particularly text and line art regions—identifying the antialiased regions and then the appropriate technique for rendering the antialiased regions—in order to obtain acceptable edge quality. This aspect is further based on the discovery of a technique that alleviates this problem. The technique employs a memory efficient pixel tagging architecture that distinguishes between image types (binary text or lines and continuous tone) and determines whether a given pixel has been antialiased. Previous tagging methods have required five scanline buffers to accurately tag thin lines that are gray due to antialiasing. The present invention detects thin anti-aliased lines and anti-aliased edges using as little as two scanlines of pixel buffering in conjunction with a scanline of binary tags. The method employs memory for temporarily storing a scanline of tags. In effect, tag values are generated by examining the pixel twice, first to tag vertical lines, edges, and possible horizontal lines, and second to confirm the tagging after the advance of a scanline.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. An "image", a pattern of physical light, may include characters, words, and text as well as other. features such as graphics. An image may be divided into "segments," each of which is itself an image. A segment of an image may be of any size up to and including the whole image.

Each location in an image may be called a "pixel." Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

A "version" of a first image is a second image produced using an item of data defining the first image. The second image may be identical to the first image, or it may be modified by loss of resolution, by changing the data defining the first image, or by other processes that result in a modified version.

An "image input device" or "image input terminal" is a device that can receive an image and provide an item of data defining a version of the image. A "scanner" is an image input device that receives an image by a scanning operation, such as by scanning a document.

An "image output device" is a device that can receive an item of data defining an image and provide or render the image as output. A "display" is an image output device that provides the output image in human viewable form.

Figure 2:
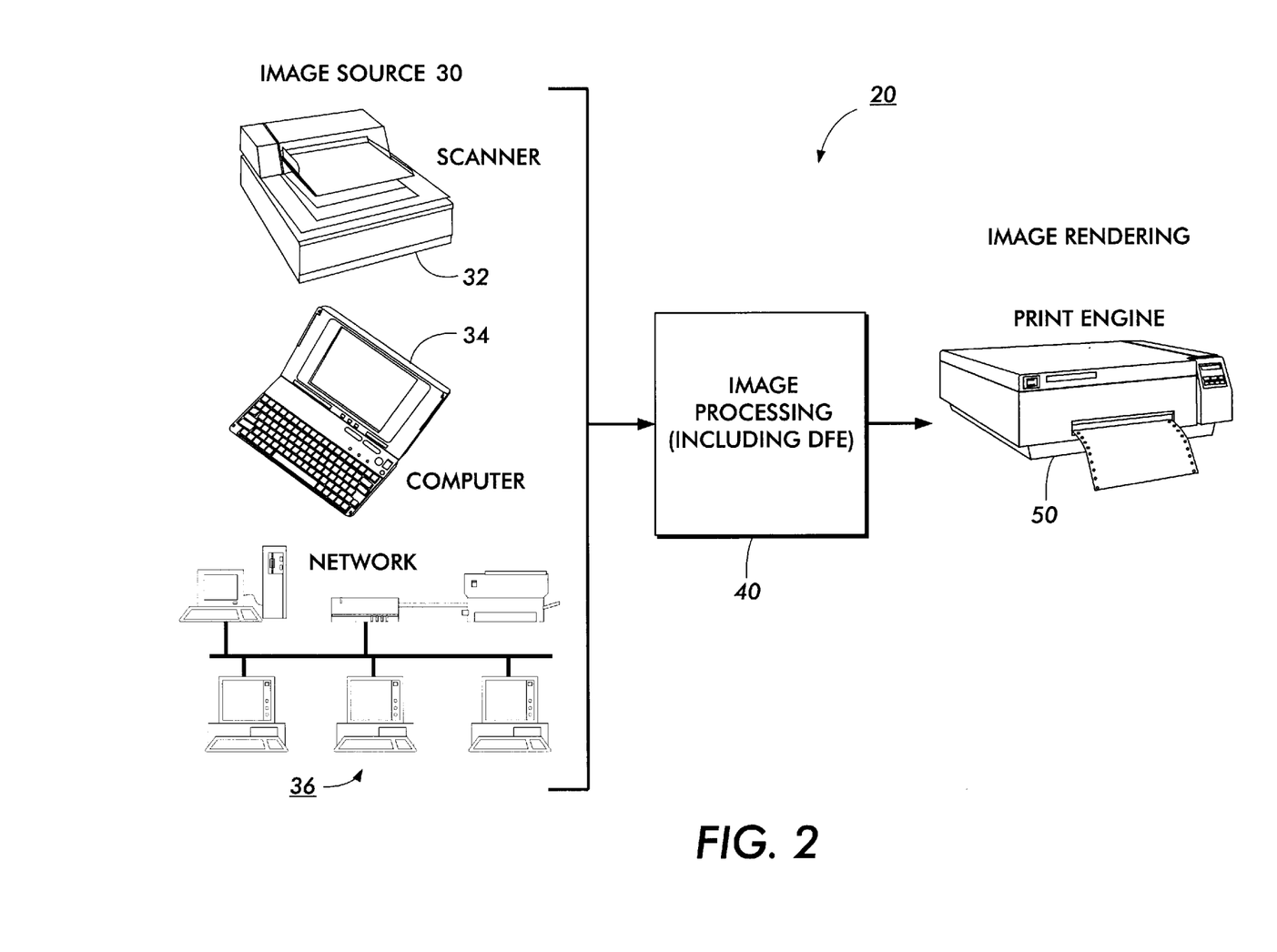
FIG. 2 is a general representation of a suitable system-level embodiment for one or more aspects of the present invention.

Turning now to FIG. 2, depicted therein is an embodiment of a preferred digital imaging system. In the system 20, image source 30 is used to generate image data that is supplied to an image processing system, also known in the art as a digital front end (DFE) 40, and which produces binary data for rendering by print engine 50. For example image source 30 may include scanner 32, computer 34, network 36 or any similar or equivalent image input terminal. On the output end printer engine 50 is preferably a xerographic engine however engine 50 may include such equivalent alternatives as ink jet, etc. The present invention is directed towards aspects of image processor 40 depicted in FIG. 2. In particular, the intention of the present invention is to identify and process accordingly those pixels generated along antialiased regions of the input image.

One form of antialiasing employs intermediate or gray intensity values to compensate for a lack of spatial resolution along edges. Consider a jaggie reduction example. Instead of a near-horizontal or near-vertical black edge on a white background jagging abruptly from one scanline or pixel to the next, the transition is softened by intermediate shades of gray. Perceived stroke width and position can also be controlled to subpixel precision via the addition of gray (anti-aliased) pixels along the edges. Some marking engines support subpixel adressability and hyperacuity. These devices can provide some control over how a spot is constructed within a pixel. A preferred embodiment would make use of the capability to control spot construction when dealing with anti-aliased pixels. For example, if a pixel is gray due to antialiasing, then its gray value indicates that an edge passed through the pixel rather than indicating the intensity of a uniform gray area. Generally, it would therefore be preferable to construct the spot within the pixel in a way consistent with the edge. For instance, if we have a target pixel that is gray due to antialiasing and it possesses a white pixel neighbor to its right and a black pixel neighbor to its left, then one would like to construct the spot for the target pixel such that it is black on the left side and white on the right. If, on the other hand, the pixel is gray pixel due to it being a sample of a gray object, then the spot should be constructed to support the halftone pattern that yields a smooth, stable gray tone.

Figure 3:
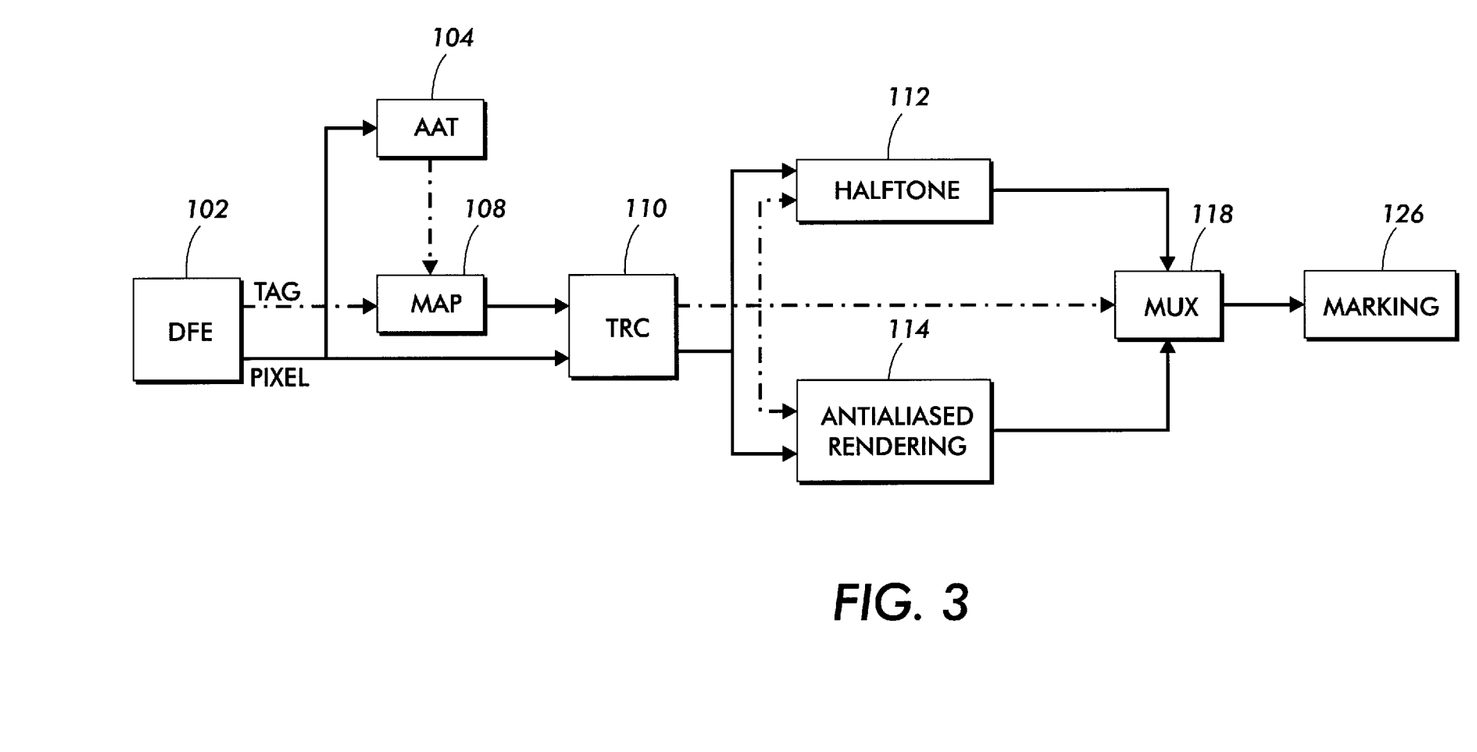
FIG. 3 is a generalized data flow representation of one embodiment of the present invention.

Referring now to FIG. 3, shown therein is a rendering architecture that enables optimal rendering of both anti-aliased pixels and gray image pixels. The present invention provides a low-cost, via a reduced scanline buffer requirement, system to implement the anti-aliased tagging (AAT) function within an architecture such as that depicted in the figure. The architecture of system 40 includes a method for transforming the continuous tone (contone)/digital data into processed binary print data.

In FIG. 3 contone/digital image data is provided to a digital front end (DFE) portion 100 of image processing system 40 for initial processing such as page decomposition, etc. In particular, the raster image data (102) output by the DFE is then supplied, as indicated, to antialias tagging (AAT) block 104. In a preferred embodiment, the AAT block tags those pixels determined to be antialiased, as will be described in further detail below, and outputs the tag to mapping block 106 where the tag may be processed further, including mapping of the tag bits to an equivalent tag and/or combination with a tag passed from the DFE. The mapped tag is then output to tonal reproduction curve (TRC) block 110 where it is employed in conjunction with the pixel value to modify the pixel. Subsequently, the pixel data and associated tags are passed to a pair of processing blocks— halftoning block 112 and antialiased rendering block 11 4. Although depicted as parallel functions, the processing carried out therein may be accomplished using a single processing block operating serially. The tag is supplied to both blocks to control processing therein, and is also used as a select signal in multiplexer 118. More importantly, the tag may be a multiple-bit tag as will be described herein, and various bits therein may be employed by the different sub-processes receiving the tag data (e.g., the processing blocks may employ certain tag bits whereas the multiplexer may utilize others).

As depicted in the figure, the embodiment also incorporates an incoming tag (tag) that could provide further information, for example, pixel type (line art, text, pictorial, halftone, antialiased, etc.). That information may be combined with the tag produced by the antialiased tagging block 104 to yield a rendering tag that possesses more information or more accurate information on a particular pixel and how it should be rendered. The combination operation carried out at 108 may be accomplished by a look-up table and the resulting tag would then be employed to direct the antialiased rendering. The output of antialias rendering block 114 and halftoning block 112 are both supplied as inputs to multiplexer 118 and selection of one of the two inputs, in response to the tag, is used to produce the process binary print data that is output from multiplexer 118.

Having described a general architecture for an embodiment of the present invention, attention is now turned to the technique to accomplish antialiased pixel tagging with a reduced buffering (memory) requirement. To better understand the scanline buffer requirements for AAT, it is necessary to first review the antialiased tagging (AAT) method.

Figure 4:
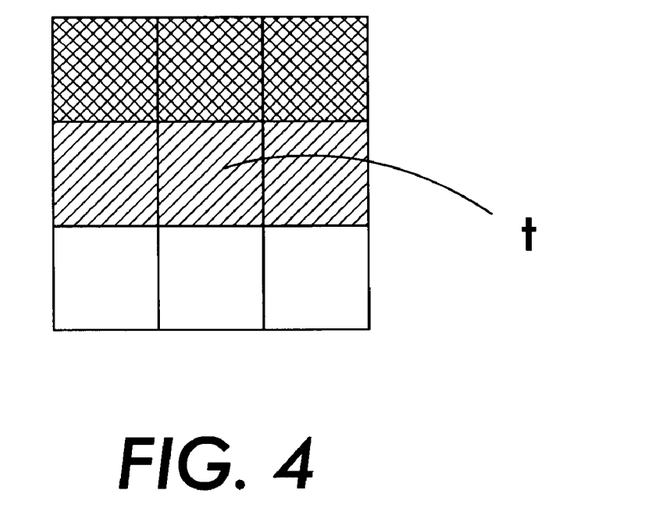
FIGS. 4–7 are exemplary illustrations of portions of an image on a pixel level.
Figure 5:
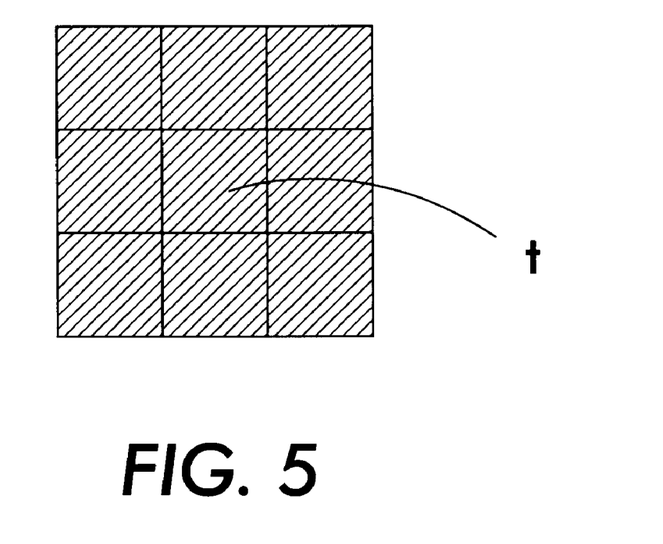

Since it is desirable to treat the rendering of the gray pixel differently depending on whether it represents an anti-aliased edge or a uniform area, it is necessary to classify the pixel. One method is to tag the pixel when the rasterization occurs, that is, to simply remember the type of pixel value constructed. However, this may not always be possible, either because of the cost of saving/transmitting such tags, a legacy architecture that does not support antialiasing tags, or because a third-party antialiasing solution does not provide tags. In any case, if such tags are not available it is possible to attempt to construct them by inference from the pixel data. Analysis of the neighborhood of the gray pixels may be conducted, and if it occurs at an abrupt transition between dark and light regions (e.g. it has a nearly saturated (black) pixel on one side and a background (white) pixel on the opposite side), then it is reasonable to assume that the pixel represents an antialiased edge. An example of such a situation is depicted in FIG. 4, where the cross-hatched pixels along the top row represent black pixels, the hashed pixels in the middle row gray and the blank pixels in the bottom row white or background. If, however, a target pixel's neighbors all have values similar to its value, then it is probably a true gray value and not an antialiased edge (see e.g., FIG. 5).

Figure 6:
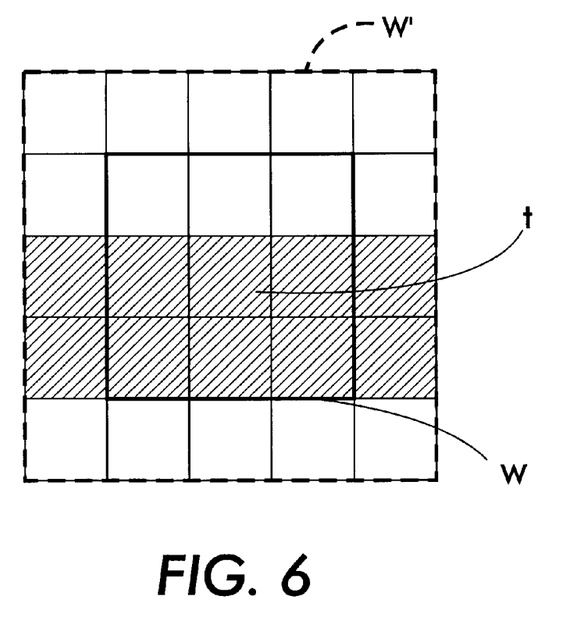
Figure 7:
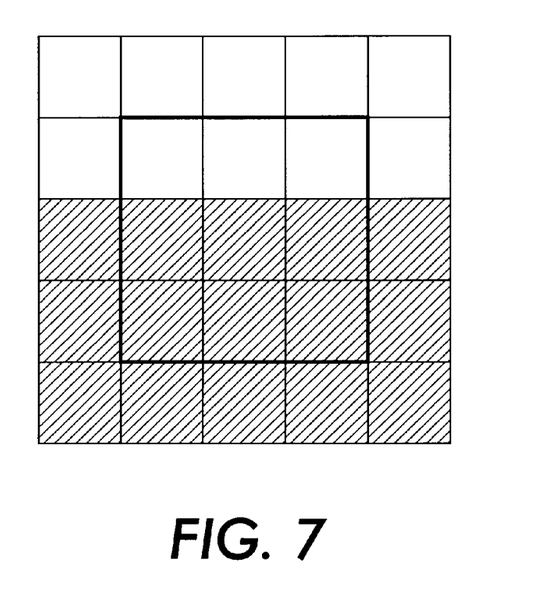

Accordingly, what is needed to detect an anti-aliased pixel is an examination of its immediate neighbors, preferably the adjoining eight pixels within a 3×3 window (W) surrounding the target pixel, for template matching. One would then need to buffer three scan lines to support this window. However, this approach cannot detect the case of a thin anti-aliased line that is rendered with a width of two anti-aliased pixels versus the edge of a uniform gray region; as shown, for example, in FIGS. 6 and 7 respectively. Thus, a larger 5×5 window region W' would be needed to distinguish the thin antialiased line.

A 5×5 window would be needed to distinguish thin anti-aliased lines (of arbitrary direction) from the edge of a uniform gray region; in turn requiring the buffering of at least five scan lines of data. One approach, based on the 5×5 window, is to look at the pattern of color transitions along cuts through the larger W' window in the horizontal, vertical and two diagonal directions. However, the amount of buffer memory can be reduced by saving only the transition comparison results rather than the pixel values for the pixels past the target pixel of interest (above and to the left), thereby eliminating the need to store the top two scan lines. Thus, one can conduct the necessary analysis having stored three scan lines of image data and two scanlines of binary transition values. However, it is possible to reduce the memory requirements even further as will be described.

A preferred embodiment of the present invention provides a method for detection of anti-aliased pixels, including thin lines, with reduced storage requirements. It requires the buffering of only three scanlines of pixel values and one scan line of binary antialiasing tags. The basic concept is to tag the ambiguous cases shown in FIGS. 6 and 7 as potentially anti-aliased, but instead of sending the pixel value and tag directly to the next stage of the image processing pipeline, the tags are retained while the next scanline is processed. The results of the next scanline are then used to either confirm the antialiasing tag or to correct the initial assignment to a non-antialiased tag value.

Figure 8:
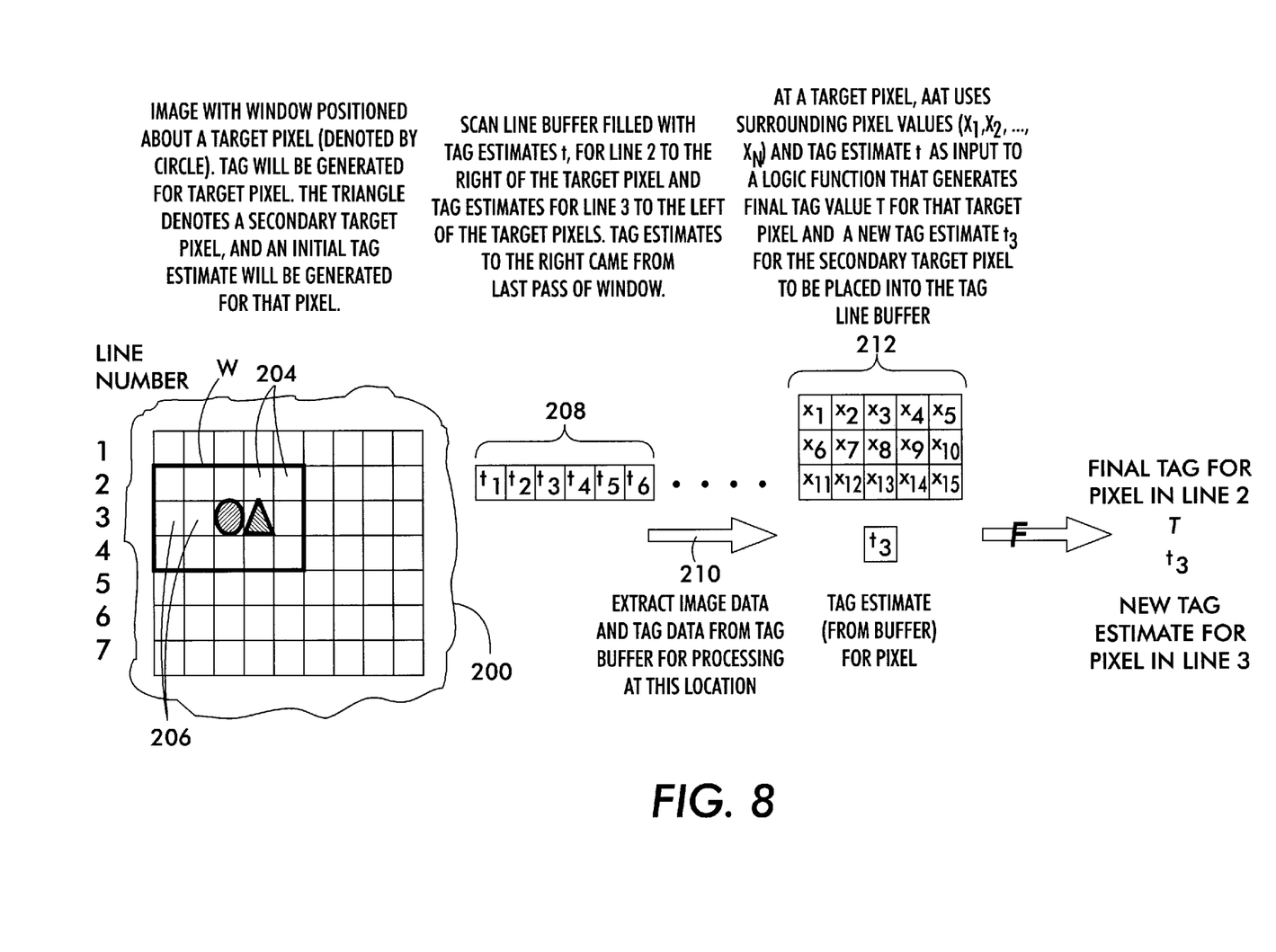
FIG. 8 is a schematic illustration of a method in accordance with the present invention for identifying antialiased pixels with a buffer line of tags for estimation and confirmation.
Figure 9:
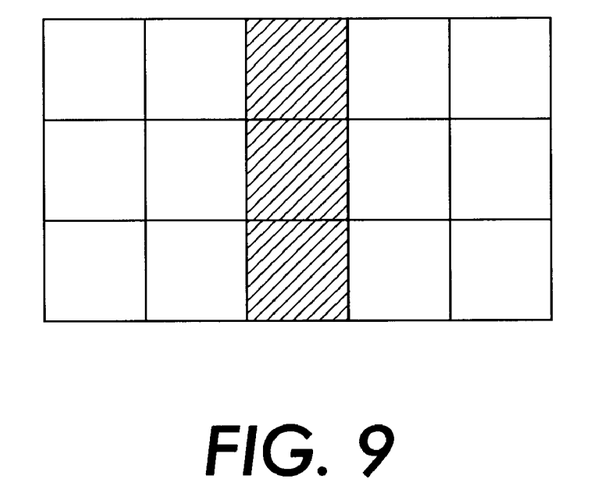
FIGS. 9–12 are exemplary illustrations of portions of an image represented in a binary (black/white) format.
Figure 10:
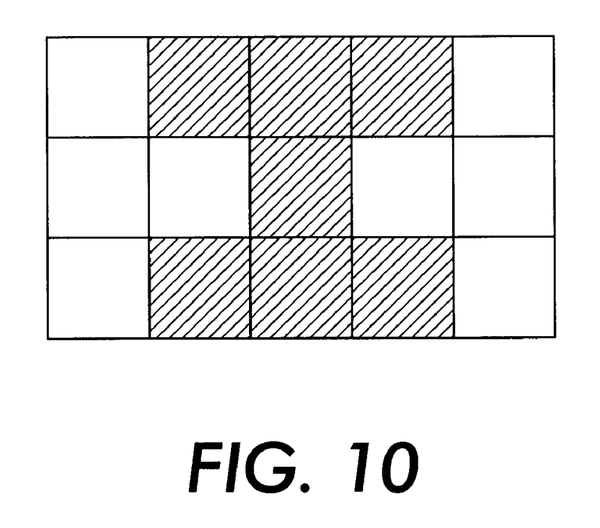
Figure 11:
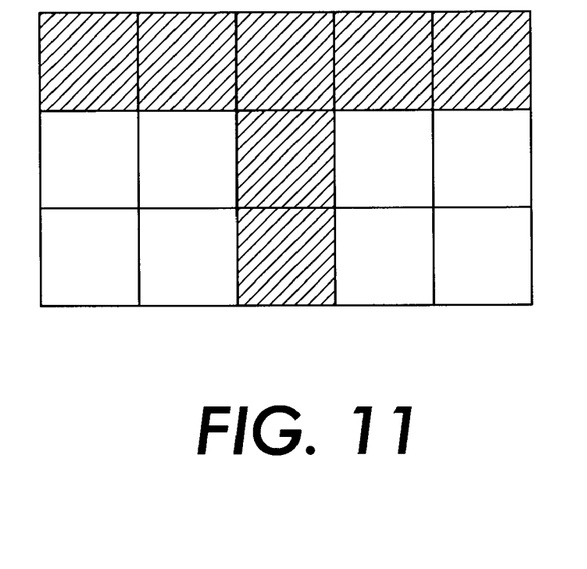
Figure 12:
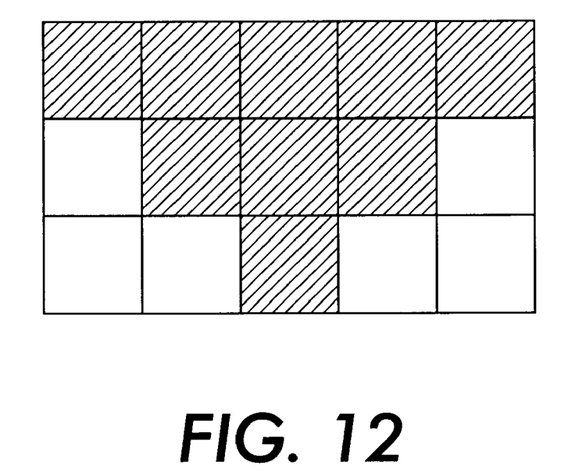

FIG. 8 illustrates the process schematically for processing with a buffer line of tags for estimation and confirmation. In the image segment 200 of FIG. 8, are depicted a first target pixel position (denoted by a circle), a secondary target pixel (denoted by triangle) within a window W generally centered about the first target pixel position. As depicted, a tag will be generated for the first target pixel position. In a preferred embodiment, the system employs a tag buffer 208 which may be any conventional memory buffer, such as a scanline buffer, suitable for storing digital data and for access in a ring- or fifo-like fashion. The size of the tag buffer is preferably at least equal to the number of pixel positions in the scanline being processed. In the buffer are stored tag estimates for at least portions of two scanlines of pixel positions. Preferably, the scan line buffer is filled with tag estimates $t_i$ for positions (204) along line 2 to the right of the first target pixel, and estimates for positions (206) along line 3 to the left of the first target pixel. It should also be noted that those tag estimates for positions in line 2 to the right of the first target pixel position resulted from a prior pass of the window/tagging operation.

Next, the tag estimates and image data within window W are extracted for processing as represented by the arrow 210. Then, at the first target pixel position, the antialiased tagging operation uses the surrounding pixel values ($x_1, x_2, x_3, \ldots, x_n$) and the tag estimate corresponding to the first target pixel position ($t_3$) as inputs to a logic function F that generates the final tag value T for the first target pixel on line 2, and a new tag estimate for the secondary target pixel on line 3. Subsequently, the target estimate for the secondary target pixel is stored in the ring-buffer so that it will be available when the window is eventually moved so as to generate a tag for the first target pixel.

Having generally characterized the operation of an embodiment of the present invention, and the manner in which the ring-like buffer can be employed to store estimated tags, attention is turned to a description of the generation and use of the tag estimates. Consider how a three scan line by five pixel window of pixel values along with a scan line's worth of tags might be employed to detect antialiased pixels. Generally, the pixel in the center of a target window will be examined and the tag for its position will be set, but that result will not be forwarded down the image path until its value is updated during the processing of the next scan. Consider first the initial setting of a tag value. One way to do this is to convert the values in the 3×5 window to binary values that indicate whether the pixel is gray or non-gray (e.g. nearly saturated or nearly background; black or white). These bit values (or some subset of them as shown in FIGS. 9–10 and 11–12 can be used as the index to a table that gives the desired tag value. In other words, the contone data is first binarized (e.g., thresholded) and the resulting bit vector from the windowed pixels surrounding the target pixel position (or a subset thereof) are used as a look-up value into a table of stored output tag values.

Alternatively, the bits can be examined by a logic function that produces the tag value. In a preferred embodiment, the logic function would be encoded as a down-loadable look-up table, which would be more general—enabling further refinements in logic to be easily incorporated into or updated in image processing equipment.

An example of such tagging logic is characterized below for the purposes of illustration and not for the purpose of limiting the scope of the present invention. Suppose the bit values for a 3×5 region in the gray/non-gray test are labeled/oriented as shown:

| b00 | b10 | b20 | b30 | b40 |
| b01 | b11 | b21 | b31 | b41 |
| b02 | b12 | b22 | b32 | b42 | where "b" is a prefix indicating a binary value for a pixel at the specified position. As stated previously, the first step is determining a new tag value corresponding to the position with bit b21. This is the first stage of the processing. If b21 is non-gray, then the new estimated tag is set to "non-antialiased" on the first pass. Otherwise, the vertical direction is checked with the following tests:

if b20 is non-gray then the new (estimated) tag for b21 is set to "antialiased," otherwise;

if b22 is non-gray and the old tag (tag for b20) for this pixel position from the previous scan is set to "anti-aliased";

then the new tag for b21 is set to "anti-aliased" (it's a two pixel wide anti-aliased horizontal line).

Otherwise it is preferable to check for edges in a diagonal direction with the following tests:

if b10 and b32 are both non-gray or if b30 and b12 are both non-gray, then the new estimated tag is set to "antialiased."

Otherwise the new tag should be set to non-antialiased.

This new tag value should not replace the old tag in the buffer of tag values until the old tag for this position, that was calculated on the previous scan, has been updated and forwarded down the image path. The old tag corresponds to the pixel with bit value b20. The updating of the old tag generates a final tag for this pixel and is the second stage of the processing, and involves two parts. For the first part of the second stage, recall that if on the previous scan two non-gray pixels were found to be aligned vertically, the old tag was set to antialiased on the assumption that there was a thin horizontal line. That assumption must now be checked.

If b21 is non-gray (or if diagonals are checked then if b11 or b31 are non-gray) then the tag value can remain as an indicator of an edge. If b22 is non-gray, then the tag can remain as an indicator of a horizontal line. Otherwise the tag should be considered as set to "non-antialiased" in so far as horizontals or diagonals are concerned, but should still be checked for a possible vertical edge or line. In the second part of the processing for the second stage, it is possible to check for antialiased vertical lines and edges by examining a row of bit values. To confirm the horizontal line or edge case, if the old tag is set to "antialiased" and if either b20 or b21 are non-gray, then the old tag can remain set to "antialiased," otherwise it should be changed to "non-antialiased."

To check for vertical edges consider the pixels in the top row. If b20 is gray then the old tag can be set to "antialiased," provided any one of the following three cases are true:

a) b10 and b30 are non-gray;

b) b00 and b40 are non-gray and their corresponding pixels have the same value; and c) b00 and b30 are non-gray and their corresponding pixels have the same value.

Figure 13:
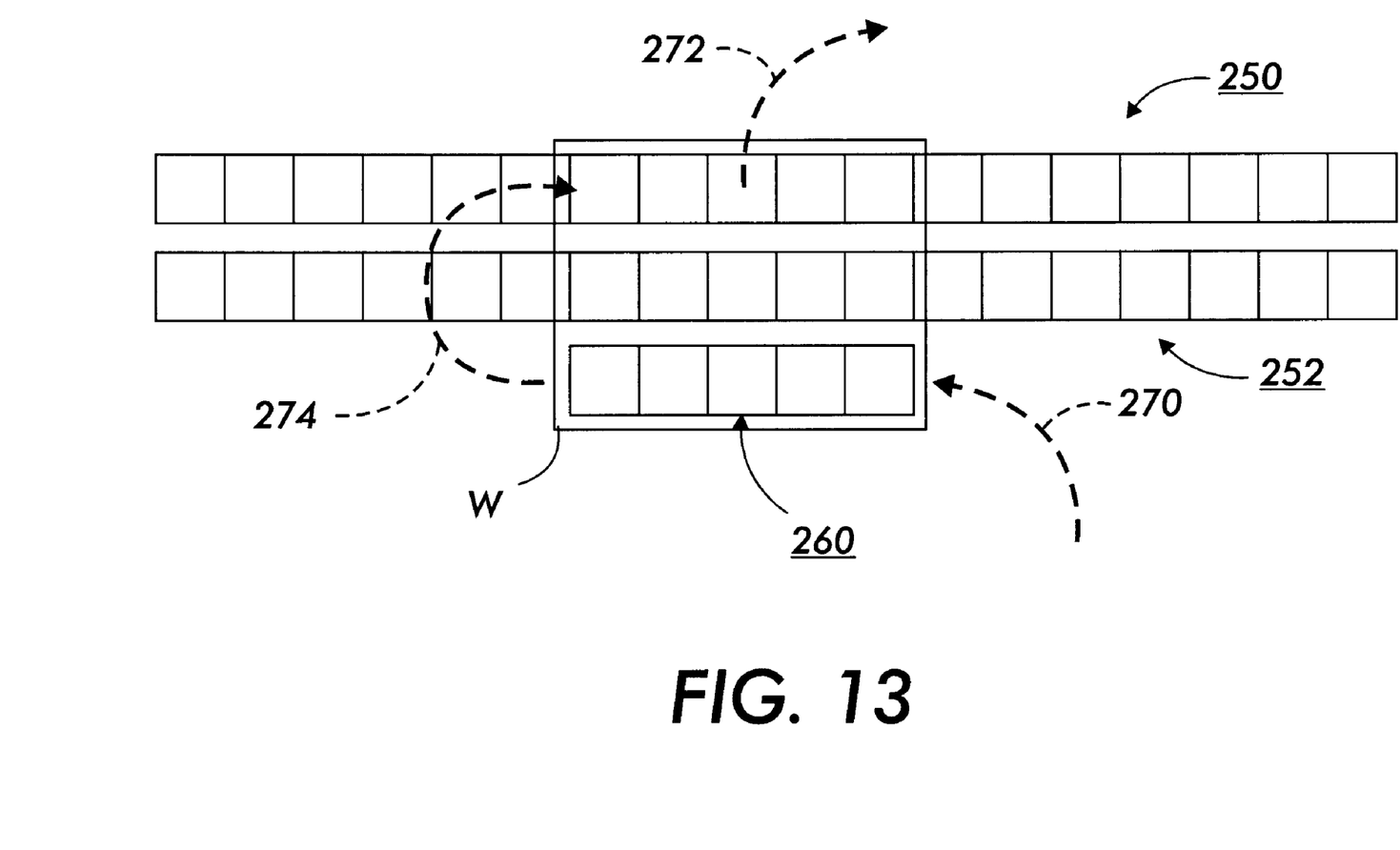
FIG. 13 is a schematic illustration of a buffering scheme employed in an embodiment of the present invention.

Note that if a table look up is used to implement this second-stage logic, the table index would be formed using the old tag value and bits b22, b21, b20, b10 and b30. But instead of including the result of the gray/non-gray test for b00 and b40, it is possible instead to include the result of tests for the equality of the corresponding pixel values p00 and p30 (note "p" prefix refers to pixel value) and the equality of the p10 and p40 pixel values. These equality checks insure that the two-pixel wide antialiased case are really thin lines on a uniform background, and not a sweep or blurred edge. Unfortunately, with only three scan lines of pixel data there is insufficient information to make a similar test for the near horizontal lines. Note further that this process assumes a strong synchronization between the input and output of the processing so that only one scanline's worth of tags need to be stored. New tags replace old as they are processed. Under this assumption it is also possible to reduce the actual storage needed for the pixel data to just two scanlines (250 and 252), plus a small overlap buffering 260 for the region of the window W. This buffering is depicted generally FIG. 13. The arrows indicate the movement of data into (270), out-of (272) and between (274) the buffers as the window moves across the scan.

Once the aforedescribed tests are complete, the old tag and the corresponding pixel value (at the position represented by b20) are be sent on through the image path as previously depicted in FIGS. 2 and 3 and the new tag value replaces the old tag value in the tag buffer 208.

In recapitulation, the present invention is a method for efficiently processing an image to detect antialiased pixels using reduced buffering memory. The method stores, in a scanline buffer memory, a predefined number of scanlines of data including data for a target pixel position and, in a tag buffer memory, a plurality of binary antialiasing tags, including at least a previously estimated tag for the target pixel position. Then using the stored pixel data and previously estimated tag, an antialiasing tag for the target pixel position is generated.

It is, therefore, apparent that there has been provided, in accordance with the present invention, a memory efficient method and apparatus for tagging antialiased pixels within an image to enable the printing of antialiased images. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for the detection of antialiased pixels within rasterized image data, comprising the steps of:
    storing, in a scanline buffer memory, a predefined number of scanlines of data including data for a target pixel position;
    storing, in a tag buffer memory, a plurality of binary antialiasing tags, including at least a previously estimated tag for the target pixel position; and
    generating, as a function of the pixel data for the target pixel and subsequent neighboring pixels and the previously estimated tag for the target pixel position, an antialiasing tag for the target pixel position.

2. The method of claim 1, wherein the buffer memory is of a size suitable for storing estimated tags for at least a scanline of pixels.

3. The method of claim 1, further comprising the steps of:
    generating, for a secondary target pixel position, an estimated tag as a function of the values of pixels surrounding the secondary pixel position; and
    storing the estimated tag in the tag buffer memory.

4. The method of claim 3, wherein the steps of generating an antialiasing tag for the target pixel position and an estimated tag for the secondary target position are accomplished during a single pass through the data.

5. The method of claim 1 wherein the estimated tag for the target pixel position is generated as a function of the values of pixels in the neighborhood of the target pixel.

6. The method of claim 4, wherein the step of generating the estimated tag comprises:
    binarizing the continuous tone data for a plurality of pixels neighboring the target pixel position to produce a bit vector; and
    applying the bit vector to a predetermined logic function, said logic function producing the estimated tag as a result.

7. The method of claim 6, wherein the binarization includes the steps of determining whether a continuous tone level of the secondary target pixel is within a range of possible values limited to those lying between near saturation and near background levels.

8. The method of claim 6, wherein the logic function is implemented as programmable look-up table, and wherein the step of applying the bit vector to a logic function to generate the output tag, further includes using the bit vector as an index value, selecting an output tag from a look-up table containing a plurality of predetermined tags.

9. The method of claim 1 wherein the antialiasing tag for the target pixel position is generated as a function of the values of pixels in the neighborhood of the target pixel and the estimated tag for the target pixel position.

10. The method of claim 9, wherein the step of generating the antialiasing tag comprises:
    binarizing the continuous tone data for a plurality of pixels neighboring the target pixel position to produce a bit vector;
    concatenating the estimated tag value to an extended bit vector; and
    applying the extended bit vector to a predetermined logic function, said logic function producing the final antialiasing tag as a result.

11. The method of claim 10 wherein the binarization includes the steps of determining whether a continuous tone level of the secondary target pixel is within a range of possible values, said range of possible values being limited to those lying between near saturation and near background levels.

12. The method of claim 10 wherein the binarization includes the steps of determining whether the a pixel value lies within a predetermined range of another pixel value.

13. The method of claim 10, wherein the logic function is implemented as programmable look-up table, and wherein the step of applying the extended bit vector to a logic function to generate the output tag, further includes using the bit vector as an index value, selecting an output tag from a look-up table containing a plurality of predetermined tags.

14. The method of claim 1, wherein the step of generating an antialiasing tag includes the steps of:
    determining whether the target pixel is non-gray, and if so, setting the antialiasing tag to not-antialiased and ending; otherwise
    testing to determine an estimated tag;
    advancing a scan line; and
    testing to determine the antialiasing tag.

15. The method of claim 14 wherein the step of testing to determine the estimated tag includes:
    testing if the target pixel is part of a near horizontal edge, and if so setting the estimated tag to antialiased.

16. The method of claim 14 wherein the step of testing to determine the estimated tag includes:

testing if the target pixel is part of an angular edge, and if so setting the estimated tag to antialiased.

17. The method of claim 15, wherein the step of testing if the target pixel is part of a near horizontal edge includes the following steps:

if a pixel immediately above, on a previous scan line, is non-gray then the new estimated tag is set to antialiased;

if a pixel immediately below, on a following scan line, is non-gray, and the estimated tag for the target pixel immediately above, on the previous scan line, is set to antialiased, then the target pixel is part of a two pixel wide antialiased horizontal line and the estimated tag is set to antialiased.

18. The method of claim 16, wherein the step of testing if the target pixel is part of an angular edge includes the following steps:

if a pixel to the upper-left, a previous pixel on a previous scan line, and a pixel to the lower-right, a following pixel on a following scan line, are both non-gray, determining that the target pixel is part of an angular edge and setting the estimated tag to antialiased; otherwise if a pixel to the upper-right, a following pixel on a previous scan line, and a pixel to the lower-left a previous pixel on a following scan line, are both non-gray, determining that the target pixel is part of an angular edge and setting the estimated tag to antialiased.

19. The method of claim 14 wherein the step of testing to determine the antialiasing tag includes confirming that the target pixel is part of a near-horizontal edge, and if so setting the antialiasing tag to antialiased.

20. method of claim 14 wherein the step of testing to determine the antialiasing tag includes confirming that the target pixel is part of an angular edge, and if so setting the antialiasing tag to antialiased.

21. The method of claim 14 where the step of testing to determine the antialiasing tag includes testing if the target pixel is part of a near-vertical edge, and if so setting the antialiasing tag to antialiased.

22. The method of claim 19 wherein the step of confirming that the target pixel is part of a near-horizontal edge includes testing to determine if the pixel immediately below, on a first following scan line, is non-gray, or the pixel two scans below, on a second following scan, is non-gray, and if so setting the antialiasing tag to the value of the estimated tag.

23. The method of claim 20 wherein the step of confirming that the target pixel is part of an angular edge includes testing to determine if the pixel below and to the left, a previous pixel on a following scan line, or if the pixel below and to the right a following pixel on a following scan line, is non-gray, and if so setting the antialiasing tag to the value of the estimated tag.

24. The method of claim 21, wherein the step of testing if the target pixel is part of a vertical edge includes the following steps:

if the target pixel is gray, and at least one of the tests selected from the group consisting of
  a) a pixel to the immediate left and a pixel to the immediate right are non-gray,
  b) a pixel to the immediate left and a pixel that is to the immediate right of the immediate right pixel are non-gray, and their corresponding pixel values are equivalent, and
  c) a pixel that is to the immediate left of the immediate left pixel and the immediate right pixel are non-gray, and their corresponding pixel values are equivalent, is true, then determining that the target pixel is part of a near vertical edge and setting the antialiasing tag to antialiased.

25. The method of claim 14 wherein the step of determining whether a pixel is non-gray includes determining whether the continuous tone level of the target pixel is within a range of possible values limited to those lying between near saturation and near background levels.

* * * * *